United States Patent Office 2,928,959
Patented Mar. 15, 1960

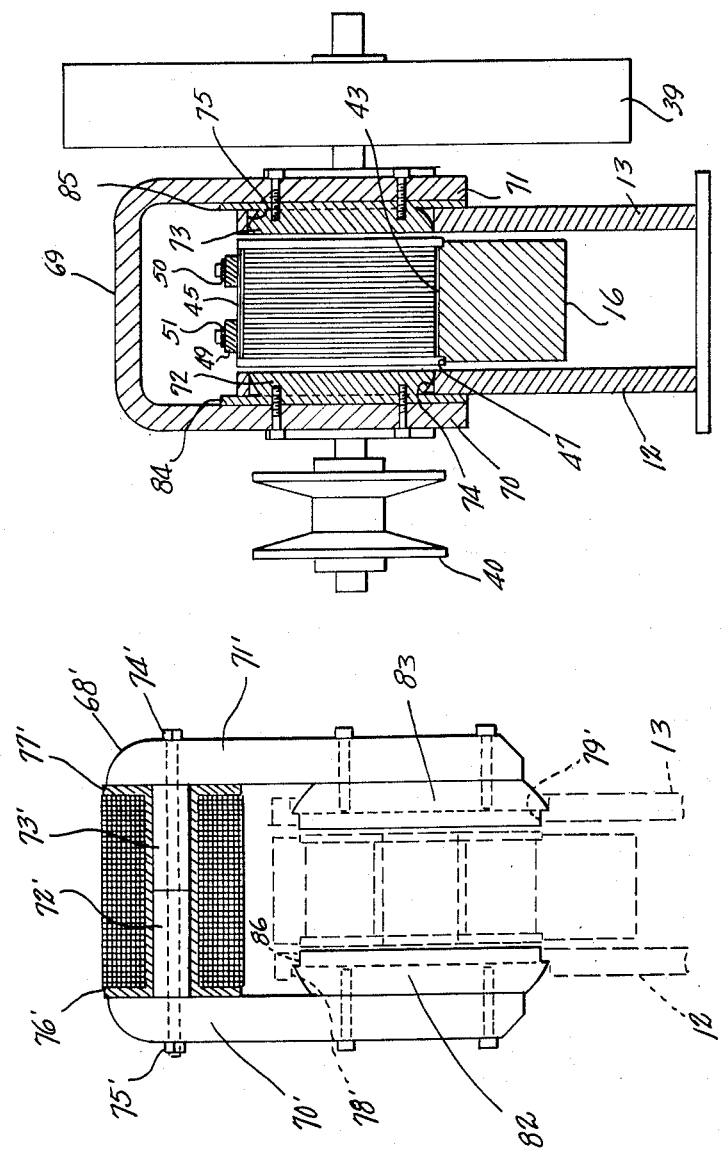

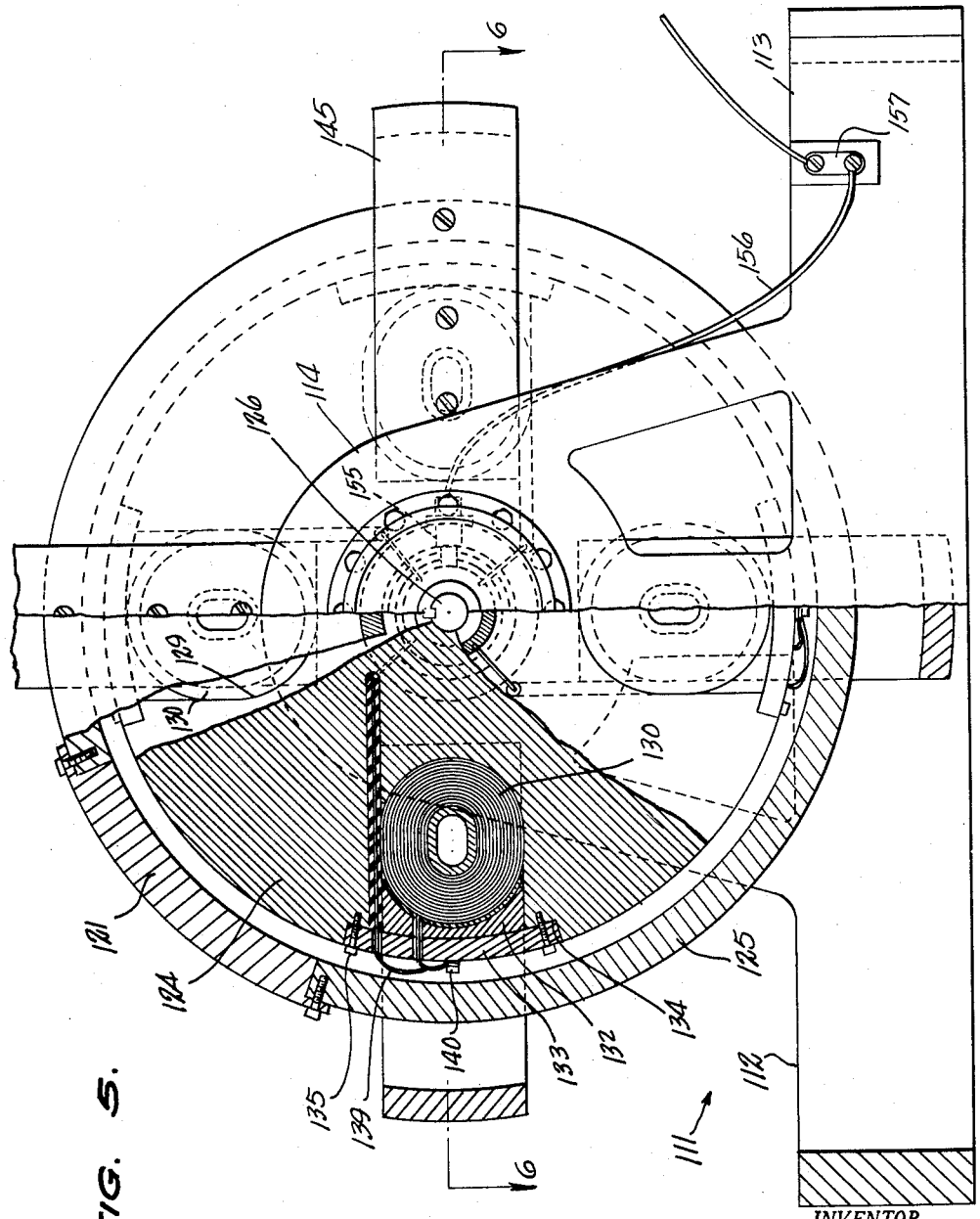

2,928,959

ELECTRICAL GENERATOR

Lorin M. Christian, Atlanta, Ga.

Application September 14, 1956, Serial No. 609,848

6 Claims. (Cl. 310—15)

This invention relates to electrical generators, and more particularly to an improved electrical generator having minimum internal resistance and having high efficiency.

A main object of the invention is to provide a novel and improved electrical generator which is simple in construction, which is relatively compact in size, which has high capacity, and which is light in weight.

A further object of the invention is to provide an improved electrical generator which is inexpensive to manufacture, which is durable in construction, which is provided with means for readily removing or replacing its coils, which is arranged so that the magnetic flux thereof is utilized with maximum efficiency, and which does not employ commutator elements of the split type, whereby sparking is completely avoided.

A still further object of the invention is to provide an improved electrical generator wherein the air gap distance between the moving armature coil and the field pole pieces are reduced to a minimum, wherein electrical resistance is minimized so that internal heating losses in the generator are low, and which is suitable for operation from any conventional source of mechanical power.

A still further object of the invention is to provide an improved electrical generator which is smooth in operation, which involves inexpensive components, and which is suitable for mass production.

Further objects and advantages of the invention will become apparent from the following description and claims, and from the accompanying drawings, wherein:

Figure 3 is a transverse vertical cross sectional view taken on the line 3—3 of Figure 2.

Figure 4 is a fragmentary elevational view of a modification of a field magnet which may be employed in an electrical-generator according to the present invention.

Figure 5 is an end elevational view, partly in vertical cross section, of a modified form of electrical generator according to the present invention.

Figure 1:
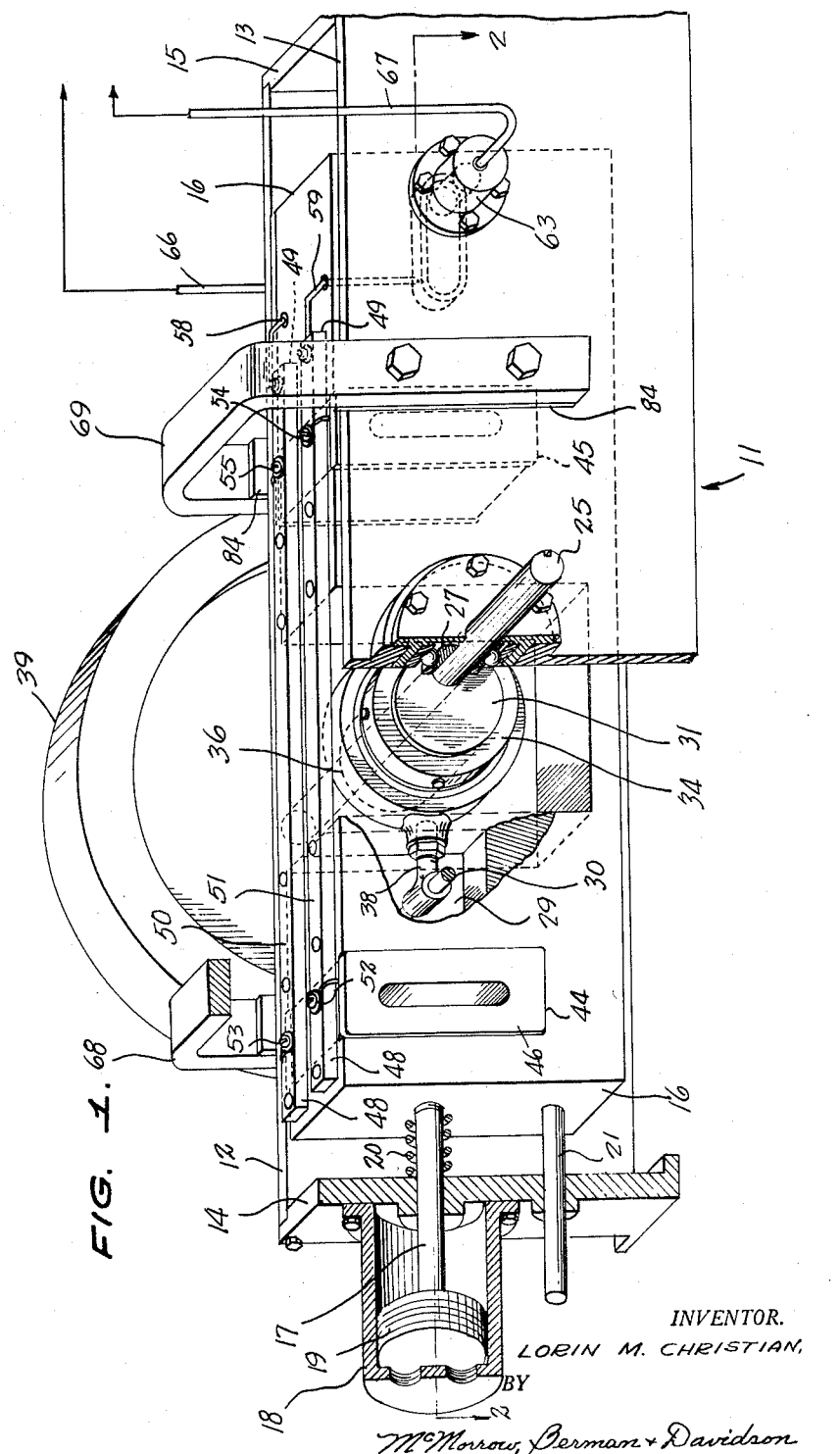
Figure 1 is a perspective view, partly broken away, of one form of electrical generator constructed in accordance with the present invention.

Referring to the drawings, and more particularly to Figures 1, 2 and 3, 11 generally designates an electrical generator according to the present invention. The generator 11 comprises a frame consisting of a pair of longitudinal side wall members 12 and 13 of any suitable material, preferably insulating material. The side walls 12 and 13 are connected at their ends by transverse end walls 14 and 15, to define a rectangular enclosure. Designated generally at 16 is an armature, in the form of a generally rectangular block of suitable non-magnetic material, such as aluminum or the like, which is disposed between the side walls 12 and 13 in the enclosure above defined, and being substantially housed in said enclosure, as is clearly shown in Figure 1. Secured to one end of the armature 16 is a longitudinal rod member 17 which extends slidably and sealingly through the end wall 14 into a cylinder 18 secured to said end wall, the rod member 17 being provided at its end with a piston 19 slidably and sealingly engaged in the cylinder 18. A coiled spring 20 surrounds the rod member 17, bearing between the end of the armature 16 and the end wall 14, as shown in Figure 1, acting as a cushioning means for cushioning movements of the armature toward end wall 14. Secured to the end of armature 16 beneath and parallel to rod member 17 is a guide rod 21 which extends slidably through the end wall 14 and cooperates with the rod member 17 to maintain armature 16 in parallel relationship to side walls 12 and 13.

Secured to the opposite end of armature 16 is a longitudinally extending rod member 23 which extends slidably through end wall 15, slidably supporting the armature on adjacent wall 15.

A coiled spring 24 surrounds the rod member 23, bearing between the end of armature 16 and end wall 15, cushioning movements of the armature toward end wall 15.

The end of armature 16 adjacent end wall 15 may be provided with a further guide rod, similar to rod 21, spaced below the main supporting rod 23, to maintain the armature 16 in parallelism with side walls 12 and 13 in the same manner as rod member 21.

Figure 2:
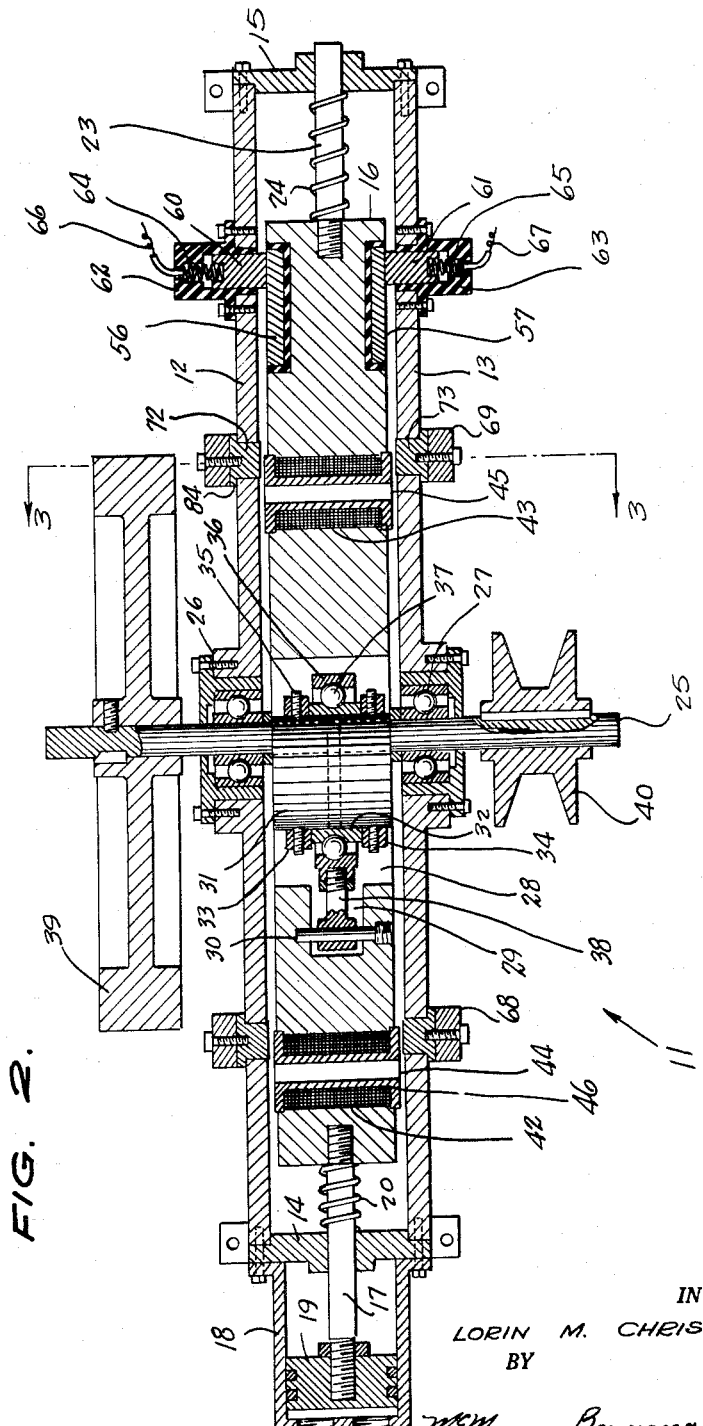
Figure 2 is a horizontal cross sectional view taken on the line 2—2 of Figure 1.

Cylinder 18 may be connected in a conventional manner to a suitable working fluid source, and may be provided with conventional valve means to admit fluid into the cylinder and to exhaust same, in properly timed sequence, in a manner well known to those skilled in the art, to reciprocate the armature 16. Alternatively, the armature may be reciprocated by any other source of mechanical power, for example, a conventional engine or motor by means of a drive shaft 25 journaled transversely in the intermediate portions of the side walls 12 and 13, as by ball bearing units 26 and 27, as shown in Figure 2, said shaft extending through an aperture 28 formed in the intermediate portion of the armature 16. Aperture 28 may, for example, comprise a generally rectangular main notch formed in the armature, said notch having a recess 29 formed in one side wall thereof in which is mounted a transverse wrist pin 30. Mounted on the shaft 25 in the aperture 28 is a generally cylindrical eccentric member 31 on which is mounted a ring member 32, said ring member being positioned on the eccentric member 31 by respective retaining collars 33 and 34 secured on opposite sides of the ring member 32 on the eccentric member 31 and passing through said eccentric member by clamping screws 35, as shown in Figure 2. An outer ring member 36 is rotatably engaged with the inner ring member 32 by the provision of bearing balls 37 between the inner and outer rings, as shown in Figure 2, whereby outer ring 36 is freely rotatable with respect to the eccentric member 31. The outer ring member 36 has rigidly connected thereto a crank rod 38 which is pivoted on the wrist pin 30, whereby rotation of the shaft 25 causes eccentric member 31 to reciprocate the armature 16 by the action of the eccentric 31 on the crank rod 38.

Mounted on one end portion of shaft 25 is a fly wheel 39 which has sufficient mass to prevent fluctuations in the rotational speed of shaft 25. A drive pulley 40 is mounted on the opposite end of shaft 25, said pulley 40 being adapted to be coupled by suitable belt means to a source of mechanical torque such as a motor or engine.

Armature 16 is formed on opposite sides of the aperture or notch 28 with additional rectangular notches 42 and 43 in which are mounted respective armature coil units 44 and 45, said armature coil units having their axes extending perpendicular to the side walls 12 and 13. Each of the armature coil units comprises a generally rectangular hollow spool 46 of suitable magnetic material, preferably, of laminated magnetic material, the turns of the coils being wound on the spool around the axis thereof and defining therewith a generally rectangular body which fits closely in the associated notch 42 or 43 in armature 16.

As shown in Figure 3, armature 16 is recessed around the ends of the notches 42 and 43, as shown at 47 in Figure 3, to receive the end flanges of the hollow magnetic spool members, whereby said end flanges interlock with the armature 16 and prevent endwise movement of the coil units. The end surfaces of the spool members are located closely adjacent to the planes of the inside surfaces of the side walls 12 and 13. Removably secured on the top surface of armature 16 in overlying relationship to the respective coil units 44 and 45 are respective pairs of retaining bars 48, 48 and 49, 49, of insulating material, extending longitudinally, as shown in Figure 1, and overlying the top surfaces of the coil units 44 and 45 to retain said units in their seats 42 and 43. The bars 48 and 49 are connected together by a pair of longitudinally extending strips 50, 51 of conductive material, such as copper, or the like, and the respective terminals of the coils of the coil units 44 and 45 are connected respectively to the strips 50 and 51, at 52, 53 and 54, 55, as shown in Figure 1.

Mounted in the opposite side faces of the end portion of armature 16 adjacent the end wall 15 and insulated therefrom, are respective conductive bar members 56 and 57 which are arranged longitudinally, as shown in Figure 2, and which are respectively connected to the conductive strips 50 and 51, as by suitably insulated connecting wires 58 and 59. Designated at 60 and 61 are respective terminal brushes which are mounted in insulating holders 62 and 63 secured in the side walls 12 and 13 adjacent the armature contact bars 56 and 57, as shown in Figure 2, the brush members 60 and 61 being biased into contact with the bars 56 and 57 by suitable coiled springs 64 and 65 provided in the holders 62 and 63, as shown in Figure 2. Terminal wires 66 and 67 are connected to the respective terminal brushes 60 and 61 through the biasing springs 64 and 65, as shown.

Designated respectively at 68 and 69 are generally U-shaped bar magnets which are mounted on the side walls 12 and 13 adjacent the mid positions of the coil units 44 and 45, the bar magnets having parallel side arms, as shown at 70 and 71 in Figure 3, said side arms extending closely adjacent the side walls 12 and 13 with the bight portions of the magnets transversely overlying said side walls, as shown in Figure 1. Secured to the inside surfaces of the side arms 70 and 71 are respective pole pieces 72 and 73 which extend inwardly through apertures 74 and 75 provided in the side walls 12 and 13, terminating closely adjacent to the planes of the respective end surfaces of the magnetic bobbin members of the coil units 44 and 45. The pole pieces 72 and 73 are of suitable magnetic material, preferably of material similar to that of which the bar magnets 68 and 69 are formed, such as, "Alnico," or similar permanently magnetized material.

In operation, as the armature 16 is moved to the right, as viewed in Figure 2, the coil units 44 and 45 pass between the pole pieces of the respective bar magnets 68 and 69, cutting the flux lines associated with the bar magnets 68 and 69 at said pole pieces, the magnetic flux being directed through the bobbins of the coil units, with a relatively high flux density in said bobbins, due to the presence of the axial air spaces in said bobbins, in which flux density is relatively low. Thus, on the movement of the armature 16 to the right, electro motive forces are generated in the respective coil units 44 and 45, and since said coil units are connected in parallel, currents flow through the coil units in the same direction to the external load, connected to the terminal wires 66 and 67. When the direction of movement of the armature 16 is reversed, namely, when the armature moves to the left, the electro motive forces generated in the coil units 44 and 45 by the passage of said coil units through the magnetic fields of the respective bar magnets 68 and 69, is reversed, whereby the currents in the coil units are reversed simultaneously, causing a reverse current to flow through the load. Thus, alternating voltage is generated by the device, causing alternating current to flow through the load device connected to the output wires 66 and 67.

As above explained, the terminal brushes 60 and 61 contact the terminal bars 56 and 57 at all times, whereby the circuit is never interrupted, and whereby sparking is reduced to a minimum.

As will be apparent, whenever it is necessary to repair or replace one of the coils 44 or 45, the coil may be readily removed, since the retaining bars 48, 48, or 49, 49, may be readily removed, allowing the coil to be lifted out of its seat 42 or 43.

Since the coil units 44 and 45 are accurately positioned, by their notches 42 and 43, the clearance spaces between the opposite end surfaces of the bobbin members of the coil units and the inside surfaces of the pole pieces 72 and 73 may be made very small, whereby magnetic losses are minimized and whereby the flux density in the coil bobbins is maintained at a high level.

While permanent magnets have been described as the source of magnetic flux, if so desired, electro magnets may be employed for this purpose, for example, in the manner illustrated in Figure 4, wherein an electro-magnet 68' is shown, said electro-magnet comprising the respective side arms 70' and 71' of suitable magnetic material, having the opposing stud elements 72' and 73' at their upper portions, the stud elements being connected together by a fastening bolt 74' extending through the upper portions of the arms 71' and 70' and said stud elements 72' and 73' and being provided with a fastening nut 75'. The studs 72' and 73' are thus held in abutment and in alignment with each other, and support the bobbin 76' of a field coil unit 77' thereon in the manner shown. The field coil unit 77' may be energized in any suitable manner, for example, from the output conductors 66 and 67 through suitable rectifiers to provide direct current for energizing the coil units 77'.

As shown in Figure 4, pole pieces 82 and 83 are provided on the arms 70' and 71', as in the permanent magnets illustrated in Figures 1, 2 and 3, said pole pieces being engaged through openings 78' and 79' provided in the side walls of the generator.

From Figure 3, it will be seen that the pole pieces 72 and 73 employed with the permanent magnets 68 and 69 are positively positioned by the provision of flanged portions 84 and 85 thereon which engage the outer surfaces of the side walls 12 and 13 adjacent the apertures 74 and 75. In the modification of Figure 4, the pole pieces 82 and 83 may be positively positioned in their apertures 78' and 79' in a similar manner, as by the provision of cooperating shoulder elements on the pole pieces and in the apertures, for example as shown at 86 in Figure 4.

As will be readily understood, if the load requirements are heavy, a plurality of units similar to that described above, and illustrated in Figures 1 to 4 may be employed, connected in parallel, and if so desired, said units may be mechanically united in a single structure employing a common drive shaft. It will also be evident that the cam members 31 of the respective segments of such a composite unit may be separated angularly, so that a polyphase generator may be thus provided.

Figure 6:
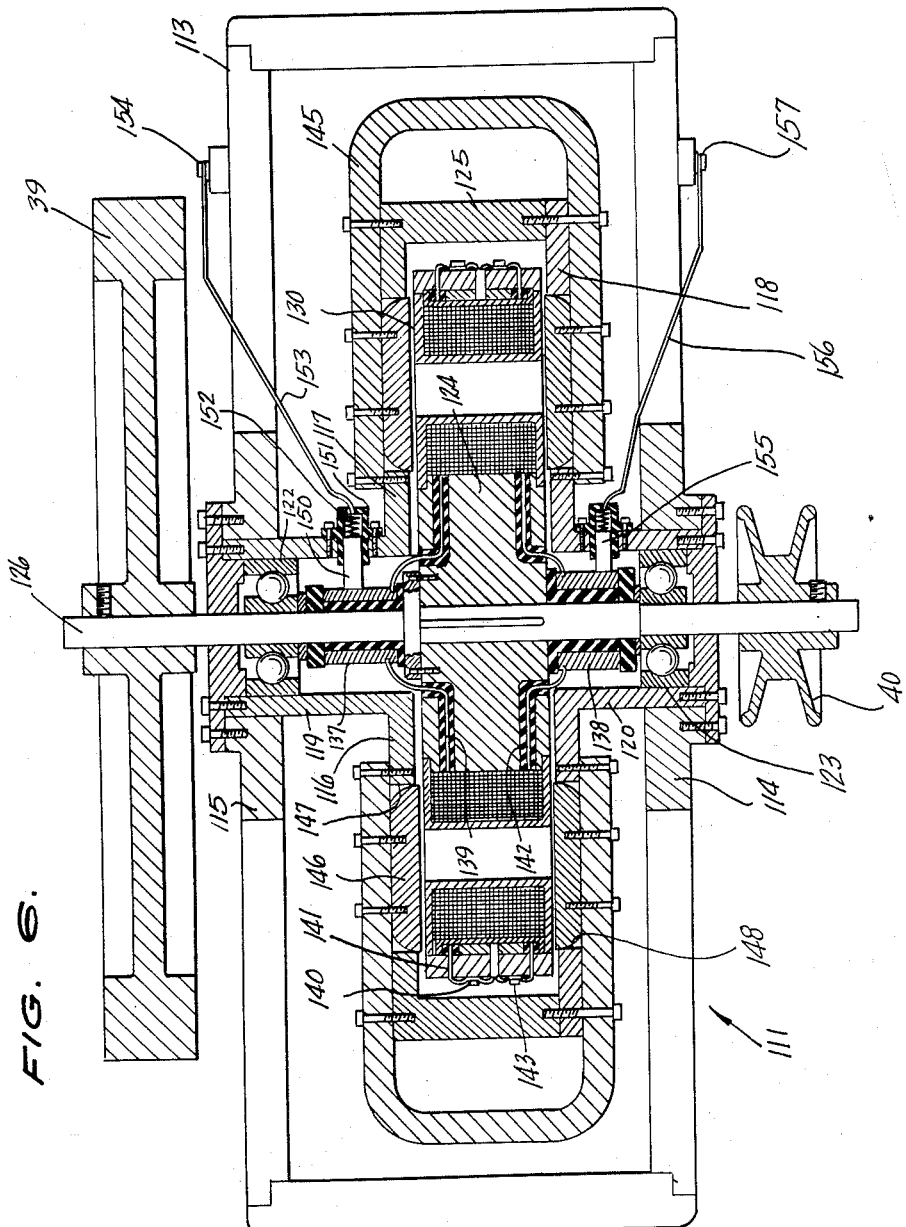
Figure 6 is a horizontal cross sectional view taken on the line 6—6 of Figure 5.

Referring now to the form of the invention shown in Figures 5 and 6, the generator therein illustrated is designated generally at 111 and comprises a main supporting frame 112 of any suitable material, preferably of insulating material, having the generally rectangular base portion 113 and the upstanding side arm portions 114 and 115. Rigidly secured between the upstanding side arm portions 114 and 115 is a generally circular supporting housing 116 comprising the respective annular side wall portions 117 and 118 having the cylindrical central support elements 119 and 120 which are secured to the top portions of the upstanding arms 115 and 114, as shown in Figure 6. The housing 116 is provided with the peripheral wall 125, said peripheral wall having a removable arcuate cover plate portion 121, as shown in Figure 5, providing access to the interior of the supporting housing 116 at times, if required. The housing 116 is preferably formed of any suitable non-magnetic material, such as aluminum, or the like.

Journaled transversely and axially in the housing 116 is the drive shaft 126, said drive shaft being rotatably supported in the cylindrical housing end portion 119 by a ball bearing unit 122, and being rotatably supported in the housing end portion 120 by a similar ball bearing unit 123. Rigidly secured on shaft 126 in the housing 116 is the generally circular armature 124 of non-magnetic material, such as aluminum, or the like.

The armature 124 is formed with a plurality of seats or notches 129 opening at the periphery thereof and being spaced apart by equal angles, as shown in Figure 5, in which are removably mounted respective armature coil units 130, the axes of said coil units extending perpendicular to the side wall portions 117 and 118 of the housing 116, as shown in Figure 6. Each coil unit has a magnetic, hollow bobbin portion, preferably of laminated material, on which is wound the turns of the coil unit, said turns being wound around the axes of the coil units, as in the previously described form of the invention. As shown in Figure 6, the end flanges of the bobbins of the coil units terminate very close to the inside surfaces of the housing side walls 117 and 118.

Each coil unit 130 includes a filler portion 132 and an arcuate cover portion 133, preferably of insulating material, which is receivable in a seat 134 formed in the peripheral portion of the armature 124 and adapted to be detachably secured thereto, as by fastening screws 135, shown in Figure 5. The end surfaces of the coil units 130 are located closely adjacent the planes of the inside surfaces of the side wall portions 117 and 118.

Mounted on shaft 126 on opposite sides of the armature 124, and insulated therefrom, are respective contact sleeves 137 and 138. One terminal of each coil unit 130 is connected to the contact sleeve 137, as by insulated wires 139 extending through the armature 124 and connected to terminals 140 on the arcuate covers 133 associated with the coil units, the terminals 140 being connected by wires 141 to the respective end terminals of the coil units. Similar insulated wires 142 connect terminals 143 on the coil units to the other contact sleeve 138, the terminal wires of the coil units being connected to the terminals 143 in the same manner as previously described in connection with the terminals 140.

As will be readily apparent, each of the coil units 130 is easily removable from the armature 124 by rotating the armature until it is in alignment with the aperture provided by the removal of the outer cover 121. By disconnecting the terminals 140 and 143 of the coil units from their associated connecting wires 139 and 142, the coil units may be then removed by unfastening their retaining screws 135.

Mounted on the housing 116 at its peripheral portion and angularly spaced thereon in the same manner as are the coil units 130 are a plurality of bar magnets 145, the side arms of the permanent magnets 145 being parallel and extending closely adjacent the outer surfaces of the respective side walls 117 and 118 of housing 116. Said side arms are secured to the side walls of the housing with the bar magnets arranged radially, as shown in Figure 5, the side arms of the bar magnets being provided with pole pieces 146 which are received in apertures 147 and 148 provided in the respective side walls 117 and 118 and which terminate adjacent the paths of movement of the ends of the respective coil units 130. Thus, as shown in Figure 6, the pole pieces 146 are spaced at the same radial distances from the shaft 126 as are the coil units 130, whereby said coil units pass through the magnetic flux provided between the opposing pole pieces of the magnets.

As in the previously described form of the invention, the hollow magnetic supporting bobbins of the coil units serve to divert the magnetic flux through paths closely adjacent to the turns of the coil units whereby magnetic losses are minimized and whereby said turns cut maximum numbers of magnetic flux lines as the coil turns pass between the pole pieces 146 of the bar magnets.

Mounted in the cylindrical housing end portion 119 is a terminal brush assembly comprising the brush member 150 which is supported in the brush housing 151 of insulating material, and shown in Figure 6, and which is biased into sliding contact with the contact sleeve 137, as by a coiled spring 152. A terminal wire 153 is connected to the brush 150 through the coiled spring 152 and is connected at its outer end to one of the generator terminals 154. A similar brush 155 is provided on the housing cylindrical end portion 120, said brush 155 engaging the contact sleeve 138 and being connected by a terminal wire 156 to the remaining generator terminals 157.

As in the previously described form of the invention, the shaft 126 is provided at one end portion thereof with a fly wheel 39 to provide smooth rotation of shaft 126 and to prevent fluctuations in speed of said shaft. A drive pulley 40 is mounted on the opposite end of shaft 126, for coupling shaft 126 to a suitable source of mechanical power, such as a motor or engine.

As in the previously described form of the invention, instead of employing permanent magnets 145 as the source of magnetic flux, electromagnets may be employed, such as electromagnets illustrated in Figure 4, the electromagnets being energized from any suitable source, for example, from the output terminals 154 and 157 of the generator.

As will be readily apparent, if the load requirements are heavy, the generator may comprise a plurality of units, such as illustrated in Figures 5 and 6, connected in parallel, or mechanically united and having a common drive shaft.

While certain specific embodiments of an improved electrical generator have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an electrical generator, support means comprising a pair of spaced parallel side wall members, respective transverse end members connecting the end portions of said side wall members, an armature disposed between said side wall members, means on the ends of said armature slidably engaging said end members and supporting said armature for movement parallel to and between said side wall members, an armature coil mounted on said armature, with its axis perpendicular to said side wall members and its respective ends located inwardly adjacent said side wall members, means for reciprocating said armature, a magnet mounted on said side wall members and having a pair of parallel pole members extending through said side wall members adjacent the respective planes of movement of the coil ends, respective terminal elements mounted in said side wall members, and respective contact strips on said armature connected to the terminals of said coil and respectively slidably engaged by said terminal elements.

2. In an electrical generator, support means comprising a pair of spaced parallel side wall members, respective transverse end elements connecting the end portions of said side wall members, an armature disposed between said side wall members, means on the ends of said armature slidably engaging said end members and supporting said armature for movement parallel to and between said side wall members, an armature coil mounted on said armature with its axis perpendicular to said side wall members and its respective ends located inwardly adjacent said side wall members, means for reciprocating said armature, a magnet mounted on said side wall members and having a pair of parallel pole members extending through said side wall members adjacent the respective planes of movement of the coil ends, respective terminal elements mounted in said side wall members, respective contact strips on said armature connected to the terminals of said coils and respectively slidably engaged by said terminal elements, and spring means arranged between the ends of the armature and said end members cushioning the reciprocating movement of the armature.

3. In an electrical generator, support means comprising a pair of spaced parallel side wall members, respective transverse end members connecting the end portions of said side wall members, an armature disposed between said side wall members, means on the ends of said armature slidably engaging said end members and supporting said armature for movement parallel to and between said side wall members, an armature coil mounted on said armature with its axis perpendicular to said side wall members and its respective ends located inwardly adjacent said side wall members, a transverse shaft journaled in said side wall members, and means for reciprocating said armature responsive to rotation of said shaft, a magnet mounted on said side wall members and having a pair of parallel pole members extending through said side wall members adjacent the respective planes of movement of the coil ends, respective terminal elements mounted in said side wall members, and respective contact strips and said armature connected to the terminals of said coil and respectively slidably engaged by said terminal elements.

4. In an electrical generator, support means comprising a pair of spaced parallel side wall members, respective transverse end members connecting the end portions of said side wall members, an armature disposed between said side wall members, means on the ends of said armature slidably engaging said end members and supporting said armature for movement parallel to and between said side wall members, an armature coil mounted on said armature with its axis perpendicular to said side wall members and its respective ends located inwardly adjacent said side wall members, said armature being formed with an aperture, a transverse shaft journaled in said side wall members and extending through said aperture, an eccentric disc on said shaft in said aperture, an eccentric ring rotatably mounted on said disc, rod means connecting said ring to said armature and being formed and arranged to reciprocate said armature responsive to rotation of said shaft, a magnet mounted on said side wall members and having a pair of parallel pole members extending through said side wall members adjacent the respective planes of movement of the coil ends, respective terminal elements mounted in said side wall members, and respective contact strips on said armature connected to the terminals of said coil and respectively slidably engaged by said terminal elements.

5. In an electrical generator, a support means comprising a pair of spaced parallel side wall members, respective transverse end members connecting the end portions of said side wall members, an armature disposed between said side wall members, means on the ends of said armature slidably engaging said end members and supporting said armature for movement parallel to and between said side wall members, a hollow tubular armature coil mounted on said armature with its axis perpendicular to said side wall members and its respective ends located inwardly adjacent said side wall members, means for reciprocating said armature, a magnet mounted on said side wall members and having a pair of parallel pole members extending through said side wall members adjacent the respective planes of movement of the coil ends, respective terminal elements mounted in said side wall members, and respective contact strips on said armature connected to the terminals of said coil and respectively slidably engaged by said terminal elements.

6. In an electrical generator, support means comprising a pair of spaced parallel side wall members, respective transverse end members connecting the end portions of said side wall members, an armature disposed between said side wall members, means on the ends of said armature slidably engaging said end members and supporting said armature for movement parallel to and between said side wall members, a hollow tubular armature coil mounted on said armature with its axis perpendicular to said side wall members and its respective ends located inwardly adjacent said side wall members, said armature being formed with an aperture, a transverse shaft journaled in said side wall members and extending through said aperture, an eccentric disc on said shaft in said aperture, an eccentric ring rotatably mounted on said disc, rod means connecting said ring to said armature and being formed and arranged to reciprocate said armature responsive to rotation of said shaft, a magnet mounted on said side wall members and having a pair of parallel pole members extending through said side wall members adjacent the respective planes of movement of the coil ends, respective terminal elements mounted in said side wall members, respective contact strips on said armature connected to the terminals of said coil and respectively slidably engaged by said terminal elements, and spring means arranged between the ends of the armature and said end members, cushioning the reciprocatory movement of the armature.

References Cited in the file of this patent

UNITED STATES PATENTS

| 514,907 | Brush | Feb. 20, 1894 |
| 1,549,953 | Andrew | Aug. 18, 1925 |
| 2,623,187 | Adams | Dec. 23, 1952 |
| 2,758,231 | Welter | Aug. 7, 1956 |

OTHER REFERENCES

Publication: Theory and Calculations of Electrical Apparatus, by Steinmetz, 1917, McGraw-Hill Book Co., New York, N.Y., pages 450–455 inclusive.